UNITED STATES PATENT OFFICE.

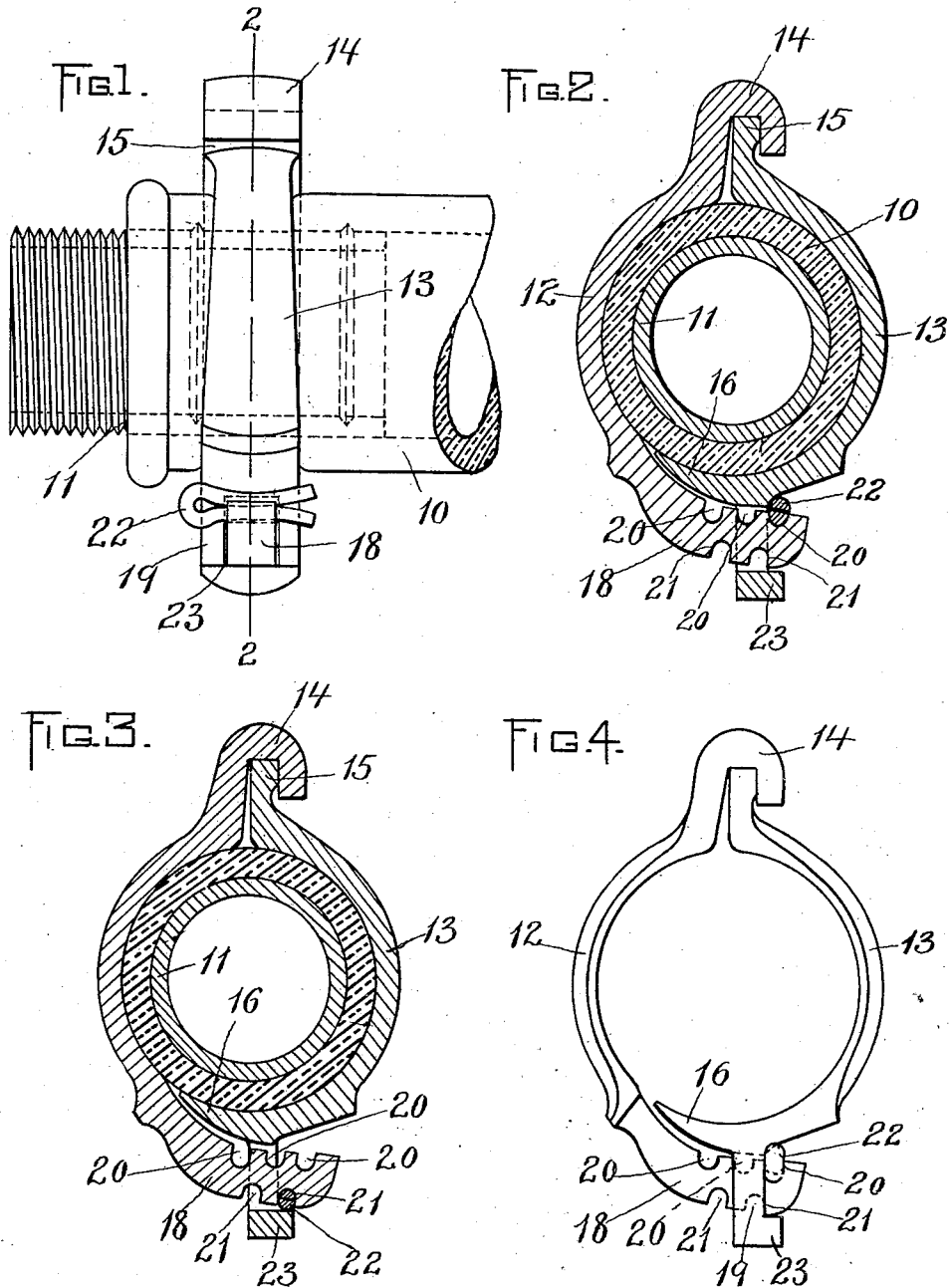

MILTON P. McLAUGHLIN, OF WAKEFIELD, MASSACHUSETTS, ASSIGNOR OF FORTY-FIVE ONE-HUNDREDTHS TO H. C. McCARTY, OF WILLIAMSPORT, PENNSYLVANIA.

HOSE-CLAMP.

No. 862,749.  Specification of Letters Patent.  Patented Aug. 6, 1907.

Application filed March 13, 1907. Serial No. 362,085.

*To all whom it may concern:*

Be it known that I, MILTON P. McLAUGHLIN, of Wakefield, in the county of Middlesex and State of Massachusetts, have invented certain new and useful Improvements in Hose-Clamps, of which the following is a specification.

This invention relates to hose clamps of malleable metal adapted to encircle a hose and a conduit member to which the hose is applied, the clamp being compressible to bind the hose tightly upon the conduit member and provided with means for maintaining any compression which may be imparted to it by external pressure.

The invention has for its object to provide a hose clamp of the general character above indicated with improved means for holding the clamp under any adjustment or compression of which it is capable, the holding means being of simple, durable and reliable character.

The invention consists in the improvements which I will now proceed to describe and claim.

Of the accompanying drawings,—Figure 1 represents a side elevation of a hose and a conduit member with my improved hose clamp applied thereto. Fig. 2 represents a section on line 2—2 of Fig. 1. Fig. 3 represents a view similar to Fig. 2 showing a different adjustment of the clamp. Fig. 4 represents an edge view of the clamp.

The same letters of reference indicate the same parts in all the figures.

In the drawings, 10 represents a flexible hose and 11 a conduit member to which the hose is secured by the clamp, to which my invention relates. Said clamp, as here shown, comprises two arms 12 and 13, which collectively form a ring or band adapted to surround the hose, the said ring or band being divided at one or more points so that it is capable of being contracted upon the hose in the manner hereinafter described. I have here shown the arms 12 and 13 made as separate segmental parts united at one side of the clamp by a hinge connection composed of a hook 14 formed on the arm 12, and lug 15 formed on the arm 13, said lug having a loose swinging engagement with the hook as fully set forth in Letters Patent of the United States No. 751,321, granted to me February 2, 1904. The ends of the arms 12 and 13, opposite those having the hook 14 and lug 15, are formed to overlap each other, the arm 13 having a pointed terminal portion or horn 16 lying within the terminal portion 18 of the arm 12, said terminal portion 18 being off-set or extended outwardly from the circle of the inner side of the main portion of the arm 12. The arm 13 is provided, near its terminal portion 16, with an ear 19 having an orifice adapted to receive the terminal portion 18 of the arm 12.

In the inner face of the terminal portion 18 are formed a series of transverse notches 20, while in the outer face of the said terminal portion are formed a series of transverse grooves or notches 21, the notches of one series being alternated or staggered relatively to the notches of the other series.

22 represents a cotter pin which is adapted to be inserted in either of the said notches. The notches and the cotter pin constitute an improved means for holding the arms 12 and 13 under any degree of compression to which they may be subjected. It is customary, after placing a clamp of this character upon the portion of the hose which surrounds the conduit member 11, to apply powerful compressive pressure to the clamp by suitable means, the pressure causing the terminal member 16 to slide upon the portion of the arm 12 on which it bears until the clamp is contracted to give the hose the desired compression. The notches 20 and 21 and the cotter pin 22 constitute my improved means for holding or retaining the clamp at various adjustments. When the clamp has been compressed, the outer end of the terminal portion 18 projects through the ear 19. One or more of the notches in said terminal portion is thus brought into position to receive the cotter pin. If the hose is of maximum thickness, its compression may cause only the outer notch 20 to project through the ear 19, in which case, the pin inserted in said notch will be confined in the notch by the adjacent surfaces of the arm 13 and ear 19, the pin therefore retaining the compressive pressure imparted to the clamp. When a greater compression of the clamp is permitted, another notch, for example the outer notch 21, may be brought into position to receive the cotter pin, in which case the pin will be retained in the notch by one side of the ear 19 and by a shoulder or projection 23 formed on the outer end of the ear.

It will be seen from the foregoing, that the plurality of notches in the opposite sides of the terminal portion 18 and the staggered arrangement of said notches provides for the insertion of a cotter pin at a considerable number of points, thus enabling the clamp to be held under a variety of adjustments.

So far as my present invention is concerned, the same being confined to the described means for retaining the clamp at the desired degree of compression, the arms 12 and 13 may be integral with each other instead of being provided with the hinge connection afforded by the hook 14 and lug 15.

What I claim is:

1. A hose clamp comprising a ring or band formed to encircle a hose, and having separable arms, one of which has an outwardly-projecting apertured ear, while the other has a terminal portion adapted to enter the aperture of said ear, said terminal portion having a plurality of pin-engaging notches, and a pin adapted to simultaneously engage either notch and the apertured arm.

2. A hose clamp comprising a ring or band formed to encircle a hose and having separable arms, one of which has an outwardly-projecting apertured ear, provided with a shoulder at its outer portion, while the other has a terminal portion adapted to enter the aperture of said ear, said terminal portion having an inner and an outer series of pin-engaging notches, the notches of one series being staggered relatively to the notches of the other series, and a pin adapted to simultaneously engage either notch and the apertured arm, the pin being confined in the outer notches by the said shoulder.

In testimony whereof I have affixed my signature, in presence of two witnesses.

MILTON P. McLAUGHLIN.

Witnesses:
C. F. Brown,
Alice L. Folsom.